Figure 1:
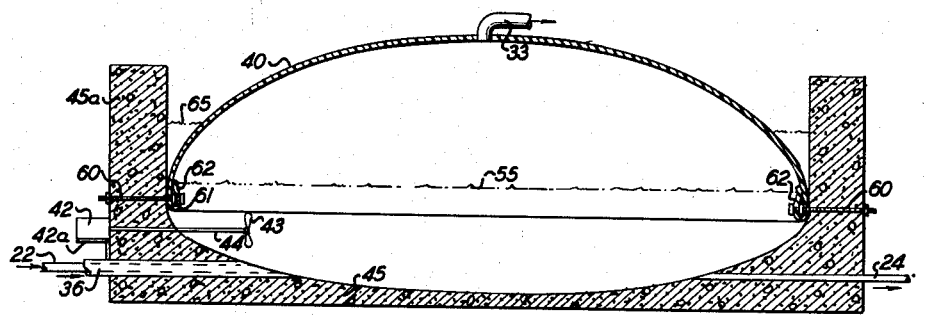

Jan. 7, 1964        I. B. MARGILOFF        3,116,611

APPARATUS FOR THE PRODUCTION OF FRESH WATER

Filed Jan. 23, 1961        3 Sheets-Sheet 1

United States Patent Office 3,116,611
Patented Jan. 7, 1964

3,116,611
APPARATUS FOR THE PRODUCTION OF FRESH WATER
Irwin B. Margiloff, New York, N.Y., assignor to Halcon International, Inc., a corporation of Delaware
Filed Jan. 23, 1961, Ser. No. 84,213
6 Claims. (Cl. 62—123)

This invention relates to apparatus for use in processes for treating solutions in order to separate solvent therefrom, more particularly in processes for preparing fresh or potable water from sea water or brackish water (having over 500 p.p.m. of solute) wherein the saline water is partially frozen, by evaporation of a water-immiscible refrigerant in contact therewith, the resulting ice is separated from the remaining salt water and this ice is melted to give fresh or potable water, and especially to such apparatus including an enclosure which is in part collapsible, the edges thereof being adapted to be closed by a liquid seal.

Various proposals have been made for recovering potable water from sea water or the like materials, including direct or indirect cooling and freezing, and separation of frozen relatively pure water from the more concentrated liquid saline water. However, these processes are relatively costly as to the capital investment required including material, fabrication and installation costs, and accordingly their commercialization has been retarded. The art is confronted by the problem of providing apparatus for use in processes for the recovery of fresh or potable water from saline water at economically low operating costs and especially at an attractively low capital investment.

The discoveries associated with the invention relating to solution of the above problems and the objects achieved in accordance with the invention as described herein includes the provision of:

An apparatus adapted for use in refrigerating a liquid comprising the combination of an enclosure adapted to be supported on the ground and a substantial upper part of which is collapsible, means for introducing liquid to be refrigerated and means for introducing liquid refrigerant, means for removing a mixture containing refrigerated liquid from below the liquid level therein, and means for removing vaporized refrigerant from above the liquid level therein, the edges of said upper part being set in and near upwardly extending sides of the lower part so as to provide for a liquid seal therebetween;

Such an apparatus including means for agitating the liquid mixture;

Such an apparatus wherein the means for removing vaporized refrigerant is a tube leading from the upper part of the enclosure;

Such an apparatus wherein the means for removing vaporized refrigerant is a rigid tube passing down through the lower part of the enclosure;

Such an apparatus wherein the agitating means includes a propeller adapted to mix frozen liquid particles with the liquid;

Such an apparatus wherein the vapor containing part of the enclosure is collapsible, and the lower part is rigid;

Such an apparatus adapted to contain liquid at a depth of about 18 inches, and providing for a liquid seal having a hydrostatic head of at least about two and one third feet;

And other objects which will be apparent as details or embodiments of the invention are set forth hereinafter.

Figure 4:
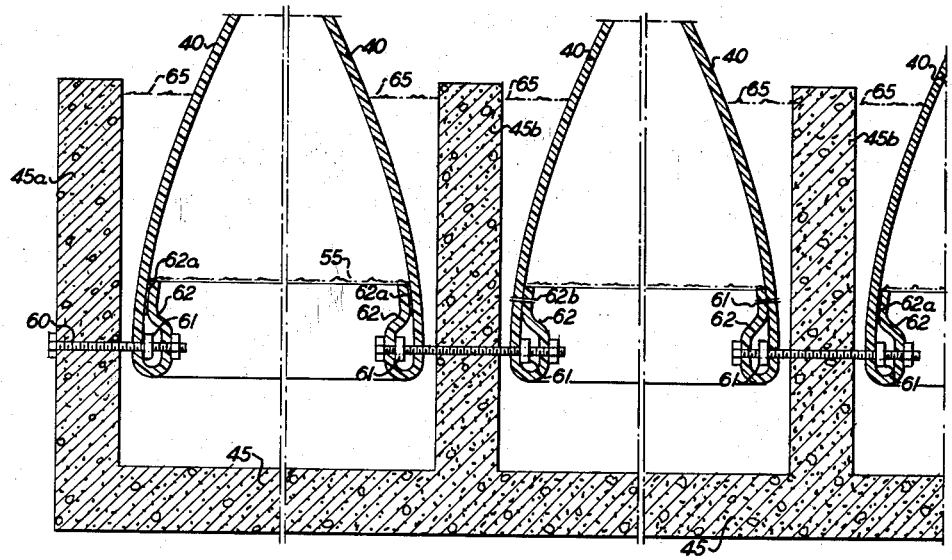
Figure 5:
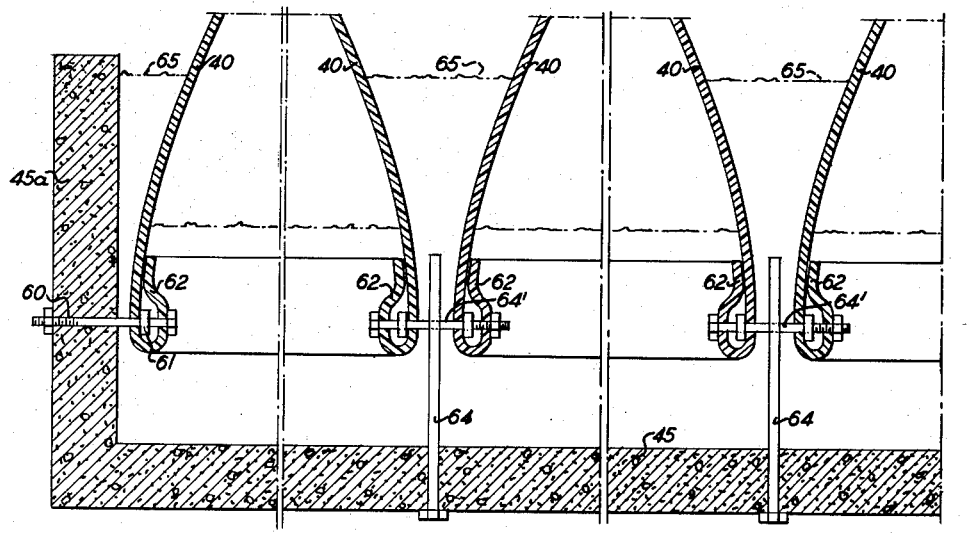
Figure 6:
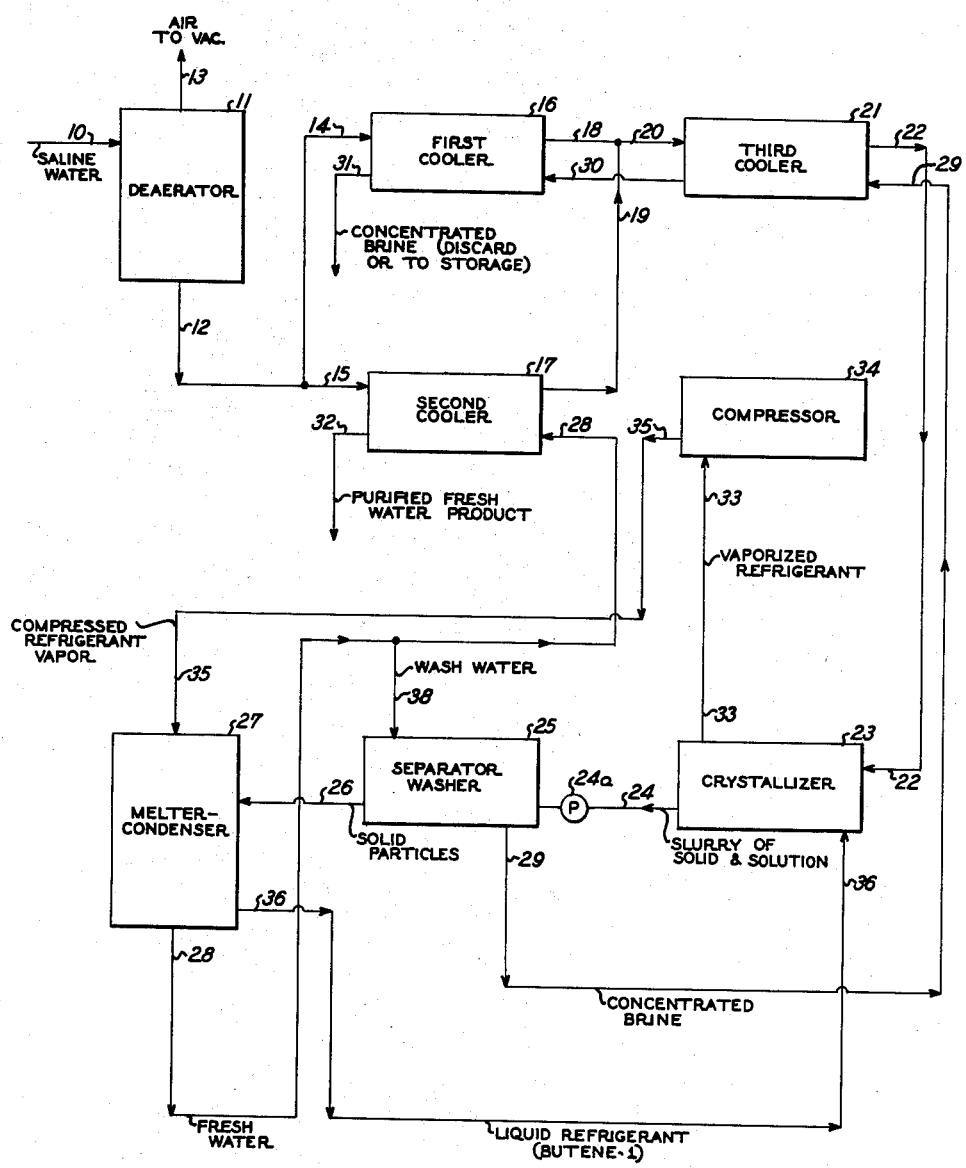

FIGURES 1, 2, 3, 4, and 5 are schematic illustrations of preferred embodiments of the invention and FIGURE 6 is a schematic illustration of an overall system.

In the overall system, as illustrated in FIGURE 6 saline water (having more than 500 p.p.m. solute) enters through line 10. It is deaerated in vessel 11 by the application of vacuum and heat or steam. Air and other non-condensible dissolved gases pass out thruogh the vacuum line 13. A portion (e.g. about two thirds) of the deaerated saline water is passed through lines 12 and 14 into a first cooler 16 and the remainder is passed through line 15 into a second cooler 17. The cooled outlet saline water from both coolers is led through lines 18 and 19 and passed through line 20 into third cooler 21. The outlet cooled saline water from third cooler 21 is passed through line 22 into crystallizer 23. The saline water is crystallized by methods such as evaporative freezing in the crystallizer in order to produce ice crystals and brine, e.g., a liquid refrigerant (such as butene-1 is mixed therewith and vaporized. The ice crystals and brine are led through line 24 into separator-washer 25 and after separation of the brine, e.g., by gravity or centrifugal filtration and washing (with wash liquor added through line 38) to remove entrained brine, the ice crystals are passed through line 26 into melter-condenser 27 where by direct heat exchange the crystals are melted to form fresh water which is passed through line 28 into the cooling side of the second cooler 17 in order to cool the saline water passing into the second cooler.

The fresh water passes out of the second cooler 17 through line 32 and is taken off as fresh water product; i.e., of not over 500 p.p.m. of solute.

The brine which is removed from the separator-washer 25 through line 29 is first passed through the cooling side of third cooler 21 and is then passed through line 30 into the cooling side of first cooler 16 to cool the saline water. The brine passing out of first cooler 16 is then removed through line 31.

The refrigerant vapors are passed from the crystallizer 23 via line 33 to compressor 34, and compressed. The compresesd vapor is passed via line 35 to vessel 27 where it is liquefied, and the liquid refrigerant is passed via line 36 to the crystallizer 23.

In order to indicate still more fully the nature of the present invention, the following examples of typical procedures are set forth, it being understood that these examples are presented as illustrative only and are not intended to limit the scope of the invention.

*Example 1*

Figure 3:
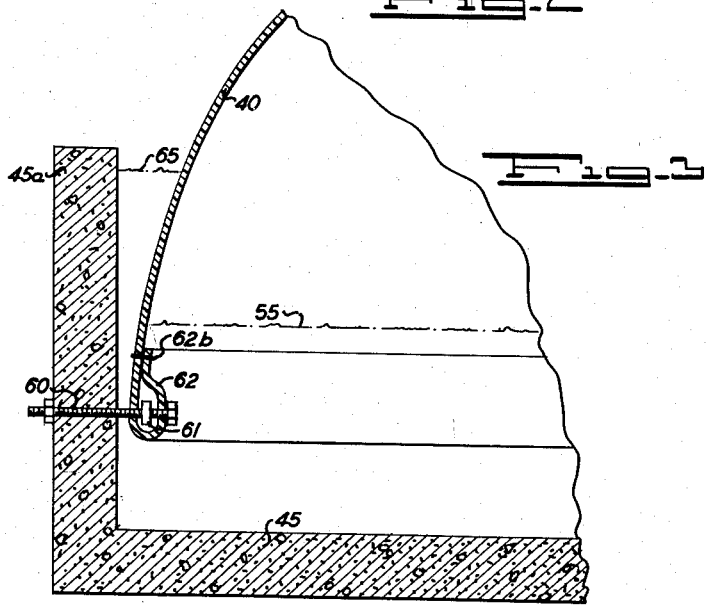

The crystallizer used in this example is analagous to that shown in FIGURES 1 and 3. It includes a bottom section 45 to hold a shallow pool of liquid with a rather large surface area. The pool may be circular or of any other convenient shape. It may be made of concrete or the like material set on or in the ground, which may be lined with a neoprene or the like material to render it impermeable. It also includes an upper section 40 which may be made of nylon fabric or the like flexible material and this may be treated with neoprene rubber or the like material to render it impervious. For fire resistance, it may be made of glass fabric impregnated with silicone elastomer or the like. The upper section is joined to the lower section by wall 45a, liquid seal 65, anchor bolts 60, anchor strip 61 and loop 62. The latter may be formed with stitches 62b. The height of the liquid seal balances the pressure of the contained vapor (about two and one third feet for butene-1 boiling at 15.7 p.s.i.a.).

The strip 61 may be made up of sections of metal strips which may meet or overlap at various anchor bolts.

The agitation means includes one or more propeller or the like agitators 43 each connected by means of a shaft 44 provided with suitable bearings and seals (not shown), and motor 42 provided with a suitable support 42a. The liquid to be refrigerated is introduced via line 22 and the refrigerant liquid is introduced via line 36. In the normal operation of the crystallizer, the liquid therein is at about a depth of 18 inches its surface being indicated by 55. A slurry of solid and liquid is withdrawn via line 24, and vaporized refrigerant is withdrawn via line 33. This may be made of the same material as enclosure 40.

Raw sea water (e.g. having 3.5 percent dissolved solids) is fed into a deaeration column operated at about 10 mm. Hg and air is stripped and removed overhead. The deaerated sea water passes out of the bottom of the column at 54° F. and is split into two streams, approximately one-third passing through a first cooler and the remainder passing through a second cooler. The coolers are sized so that the deaerated waters passing out of both coolers are at the same temperature, 38.2° F. The two outlet streams are combined and passed into a third cooler where they are cooled to a temperature of 34.2° F., and the resulting liquid is passed into the crystallizer 23 via line 22. Liquid commercial butene (or butene-1) is introduced into the crystallizer via line 36 and directly contacted with the cooled deaerated water to form ice crystals and brine. The temperature in the bulk of the liquid in the crystallizer is maintained at 26.3° F. by efficient agitation of the mixture in the crystallizer. Vaporized butene is removed overhead via line 33 at a temperature of 26.3° F. and passed to a compressor. A mixture of ice crystals and brine is removed via line 24.

It may be passed onto a continuous moving filter belt from which the bulk of the brine is drained by gravity flow from the first section of the moving belt. The ice crystals containing entrained brine are then washed with water to remove the brine. The washing may be in several stages, the first with sea water, the second with lower salinity water, and so on, the last wash being of low enough salinity so that the melted crystals yield water of the desired low salinity. The washed ice crystals are passed through a chute (as a slurry in water if desired) or conveyed by a bucket or screw conveyor into a melter-condenser where they are contacted with the butene vapor which condenses during the contacting step. Part of the fresh water is passed into the separator-washer to supply the wash water and the remainder passes out of the bottom of the melter-condenser at 33° F. and is led through the cooling side of the first cooler. The fresh water leaves the outlet side of the first cooler at 48.8° F. and is stripped of dissolved butene in a fresh water stripper operated at about 10 mm. Hg. The stripped fresh water is removed from the bottom of the stripper (not shown) and collected as product. There is obtained an overall yield of fresh water (having not over 500 p.p.m. of solute) of approximately one-third by weight of the raw sea water feed.

The brine which is separated from the ice crystals on the moving belt is passed through the third cooler at a temperature of 27° F., and is then passed into the cooling side of the second cooler at a temperature of 33° F. The brine leaves the outlet side of the second cooler at 48.6° F. and is stripped of dissolved butene in a stripper (not shown) operated at about 10 mm. Hg and passes out of the bottom of the stripper at 54° F. as spent brine. The stripped butene from the brine and the fresh water strippers is compressed, condensed and passed back into the crystallizer.

*Example 2*

Figure 2:
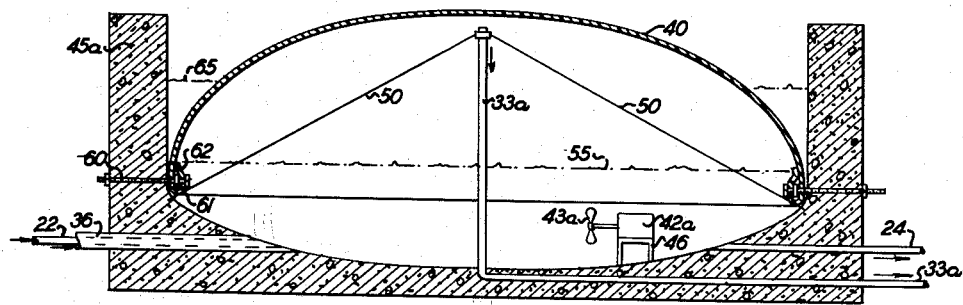

The crystallizer used in this example is analogous to that shown in FIGURE 2, and this is generally analogous to FIGURE 1. However, the vapor removal means is a vertical upright rigid pipe 33a leading from the vapor space above the liquid down through the bottom section 45. It is provided with several lines or guy wires 50 which are connected from the top of the pipe 33a to the edge of the bottom section 45, and serve to stabilize the position of the pipe 33a as well as to support the enclosure 40 during a shut-down or other situation when the crystallizer may be empty or deflated. In addition to agitation means is a submerged motor 42a supported on piers 46 and provided with an agitator 43a.

The procedure set forth in Example 1 is repeated using this apparatus and similar results are obtained.

*Example 3*

The crystallizer used in this example is analogous to that shown in FIGURE 4, having a plurality of sections, each of which is analogous to that of FIGURE 1. However, a single wall 45b is used between sections. The loop 62 may be formed with a cemented lap 62a or with stitches 62b, or both.

The procedure set forth in Example 1 is repeated using this apparatus and similar results are obtained.

*Example 4*

The apparatus of FIGURE 4 is modified as indicated in FIGURE 5 to eliminate wall 45b between sections. Instead, the liquid seal 65 is maintained by two flexible members 40 held by anchor strips 61, loops 62, and anchor bolts 64.

The procedure of Example 1 is repeated using this modified apparatus and similar results are obtained.

The sections may be arranged in parallel, or they may be in the form of concentric rings or loops. Each may have its own service lines or a common system may be used for all the vessels.

Liquid depths of about 18 inches are used. Greater depths are operative but unattractive from the economic viewpoint, especially as to the cost of compressing the refrigerant vapor.

The refrigerant should provide a minimum pressure of about 0.1 p.s.i.a. above the normal maximum ambient pressure, or sufficient pressure to support the upper section up to a maximum pressure such that the upper section of the enclosure can contain the same, e.g. up to about 1 or even up to 6 p.s.i.a. above the normal maximum ambient pressure. Preferred refrigerants are butene-1 and commercial butene (which is a mixture of 95% butene-1 and 5% isobutene by volume). Other inert water-immiscible materials having such vapor pressures can be used in the process as well as close boiling mixtures of such refrigerants.

The upper section of the enclosure may be of any suitable flexible reinforcing material such as woven cotton, wool, nylon, polyester fiber, glass fibers, and the like, impregnated with any suitable flexible sealant such as neoprene, silicone rubber, fluorocarbon elastomers and the like. The enclosure may also be fabricated of flexible plastic film such as nylon, polyester, polyethylene, and the like, or of thin ductile metal sheet such as aluminum. Fabrication may be by sewing, cementing or the like.

The enclosure or assembly may be insulated if desired, e.g. by a foam of polyurethane, or the like.

The bottom section may be depressed or deepened at an agitation zone, at which the depth may be about at least 9 inches deeper than the main body of liquid, so as to avoid cavitation even at the highest or most economical flow rates. In the present system, a relatively large vapor disengaging surface is provided relative to the volume of liquid, and in the vapor disengaging zone the liquid flow may be at a rate of about 0.5 to 20 feet per second desirably 1 to 10 and preferably 2 to 5. About 1.6 to 65% of the total volume of liquid present may pass through an agitation zone per minute, and the superficial liquid velocity in each agitation zone is in the range of 1.5 to 60 feet per second.

The flexible enclosure which is one of the most important features of this invention may easily be fabricated of non-inflammable or non-flame-supporting or low-burning-rate materials, such as, for example, woven glass fibers impregnated with a fluorocarbon elastomer. In the event of an explosion, fire or rapid pressure increase of the contents, hot fragments of the enclosure are not likely to ignite objects upon which they fall. Furthermore, there would be little damage due to impact of the fragments. Because of the inherent low strength of the enclosure, it acts as its own pressure relieving device or "rupture disc" and, in fact, will probably not fragment in an explosion. Instead, it will merely split and may permit prompt discharge of internal pressure.

The inherent low weight of the flexible enclosure which is one of the most important features of the apparatus, adapts it well to air transportation, for example, by military forces. Temporary installation, particularly of the design described in Example 3, is neither costly nor time consuming, and salvage upon removal may be virtually complete.

It is indeed surprising that water desalinization may be carried out in such an efficient and economic manner and at such low capital investment requirements, especially in view of the much higher cost of recent or previous proposals.

In view of the foregoing disclosures, variations and modifications thereof will be apparent to one skilled in the art, and it is intended to include within the invention all such variations and modifications except as do not come within the scope of the appended claims.

What is claimed is:

1. In an apparatus for refrigerating liquids wherein there is provided an enclosure having a collapsible top portion and a rigid bottom portion having upwardly extending sides and wherein the edge of said collapsible top portion is set in and near said upwardly extending sides, means for introducing a liquid to be refrigerated, means for introducing a liquid refrigerant, means for removing a mixture containing refrigerated liquid and means for removing vaporized refrigerant from said enclosure the improvement which comprises: a liquid seal between said collapsible top portion and rigid bottom portion.

2. The apparatus of claim 1 wherein the rigid bottom portion is adapted to contain a liquid at a depth of about 18 inches.

3. The apparatus of claim 1 wherein said liquid seal provides a hydrostatic head of at least 2⅓ feet.

4. An apparatus for refrigerating liquids which comprises: an enclosure having (1) a collapsible top portion having a loop along its lower edge, and (2) a rigid bottom portion having upwardly extending sides, said lower edge of said collapsible top portion being set in and near said upwardly extending sides; an anchor strip passing through said loop; means for securing said anchor strip and said loop to said upwardly extending sides; and a liquid seal adapted to render air-tight the space between said collapsible top portion and rigid bottom portion.

5. The apparatus of claim 4 wherein the liquid seal provides a liquid seal of at least 2⅓ feet.

6. The apparatus of claim 4 wherein said inclosure is provided with means for introducing a liquid to be refrigerated; means for introducing a liquid refrigerant; means for withdrawing vaporized refrigerant; and means for removing refrigerated liquid.

References Cited in the file of this patent

UNITED STATES PATENTS

| | | |
|---|---|---|
| 1,819,401 | Bailey | Aug. 18, 1931 |
| 2,633,172 | Treiber | Mar. 31, 1953 |
| 2,821,304 | Zarchin | Jan. 28, 1958 |
| 2,861,715 | Wissmiller et al. | Nov. 25, 1958 |
| 2,904,511 | Donath | Sept. 15, 1959 |
| 2,915,097 | Lewis | Dec. 1, 1959 |